Sept. 12, 1944.         J. D. INGRAM         2,358,165
                        ROTARY ENGINE
                    Filed April 2, 1942      5 Sheets-Sheet 4

J. D. Ingram
INVENTOR.
BY

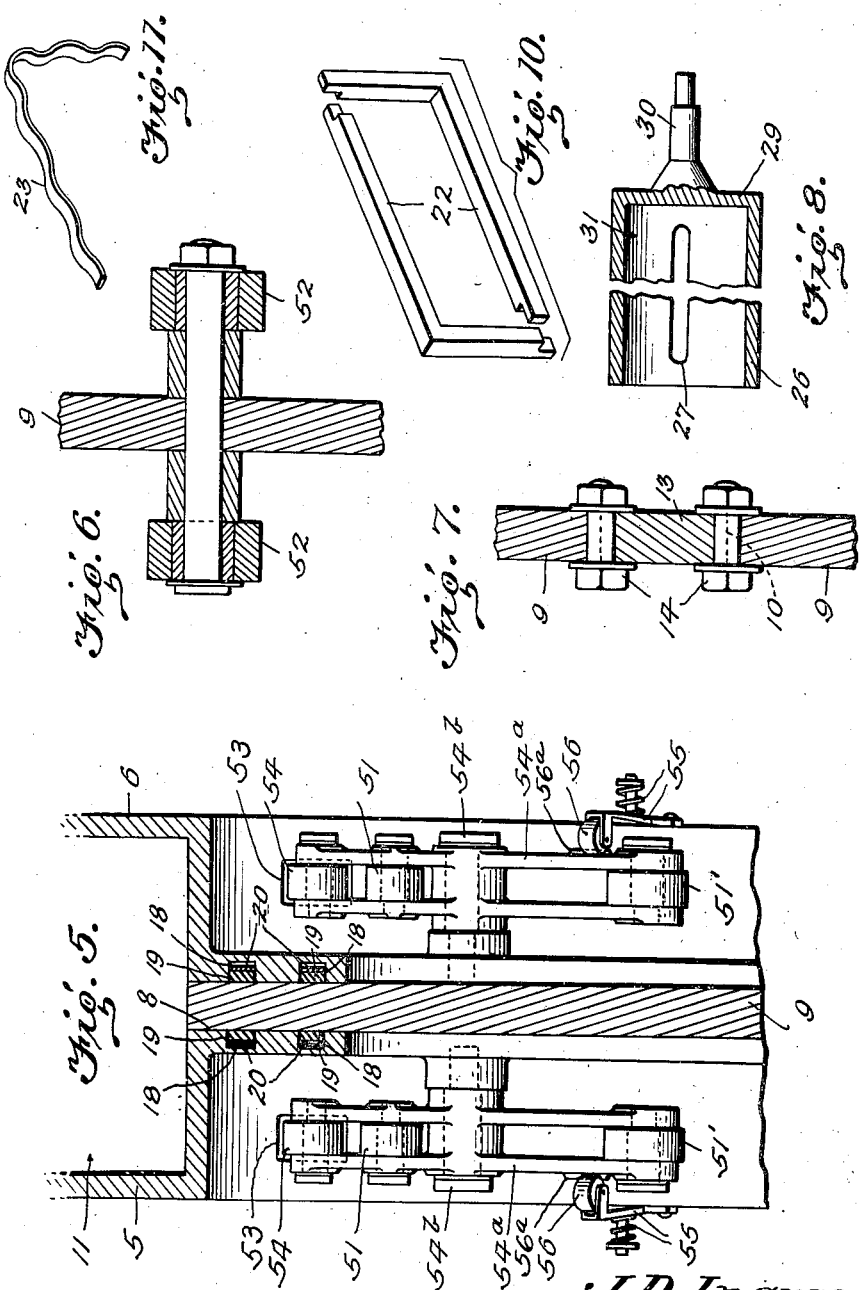

Patented Sept. 12, 1944

2,358,165

UNITED STATES PATENT OFFICE 2,358,165

ROTARY ENGINE

Joseph D. Ingram, La Jolla, Calif.

Application April 2, 1942, Serial No. 437,433

3 Claims. (Cl. 123—15)

This invention relates to rotary engines and while it has been designed primarily for use as an internal combustion engine, it can be used efficiently as a steam engine after certain obvious changes have been made.

An object of the invention is to provide an engine having one or more pistons mounted to travel in a circular path within a stator thereby to eliminate vibration and to provide an inexpensive structure which is much lighter and less complicated than other rotary engines or engines of other types.

Another object is to provide an engine utilizing a stator having a circular chamber rectangular in cross-section in which rectangular pistons are adapted to work, said pistons being connected to and adapted to rotate a disk carried by the main drive shaft of the engine.

Another object is to employ a breech or abutment mounted for movement into and out of the path of the pistons in properly timed relation with the travel of the pistons whereby the power generated by the explosion of a fuel mixture or by the introduction of steam under pressure will be intermittently transmitted to the pistons.

A still further object is to utilize the disk or rotor member of the engine as a closure for the stator in which the pistons are mounted to travel, sealing means being used in cooperation with the rotor to prevent leakage of gases under pressure.

A further object is to provide a breech mechanism of great strength, capable of precision in abrupt opening and closing in front of and behind moving pistons at any engine speed without utilizing springs.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 5 is an enlarged section on line 5—5, Figure 1.

Figure 6 is an enlarged detail section through a portion of the rotor and showing one pair of tripping rollers, said section being on the line 6—6, Figure 3.

Figure 7 is an enlarged detail section on line 7—7, Figure 3.

Figure 8 is a longitudinal detail section through the rotary valve, a portion being broken away.

Figure 9 is a perspective view of the breech or abutment.

Figure 10 is a perspective view of sealing strips used in a piston.

Figure 11 is a perspective view of a piston spring for use with the sealing strips.

Figure 1:
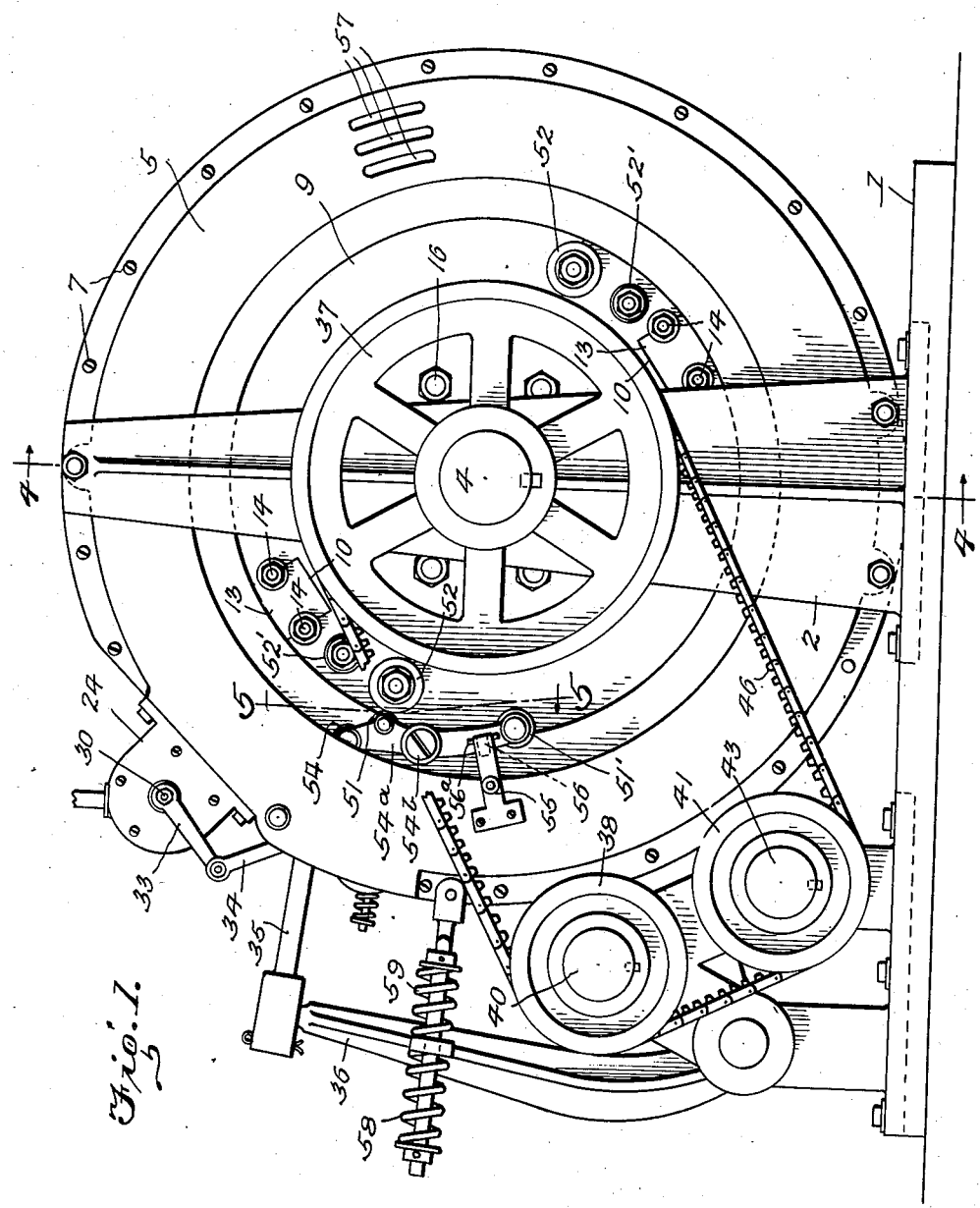
Figure 1 is a side elevation of the engine, a portion of the belt being broken away.
Figure 2:
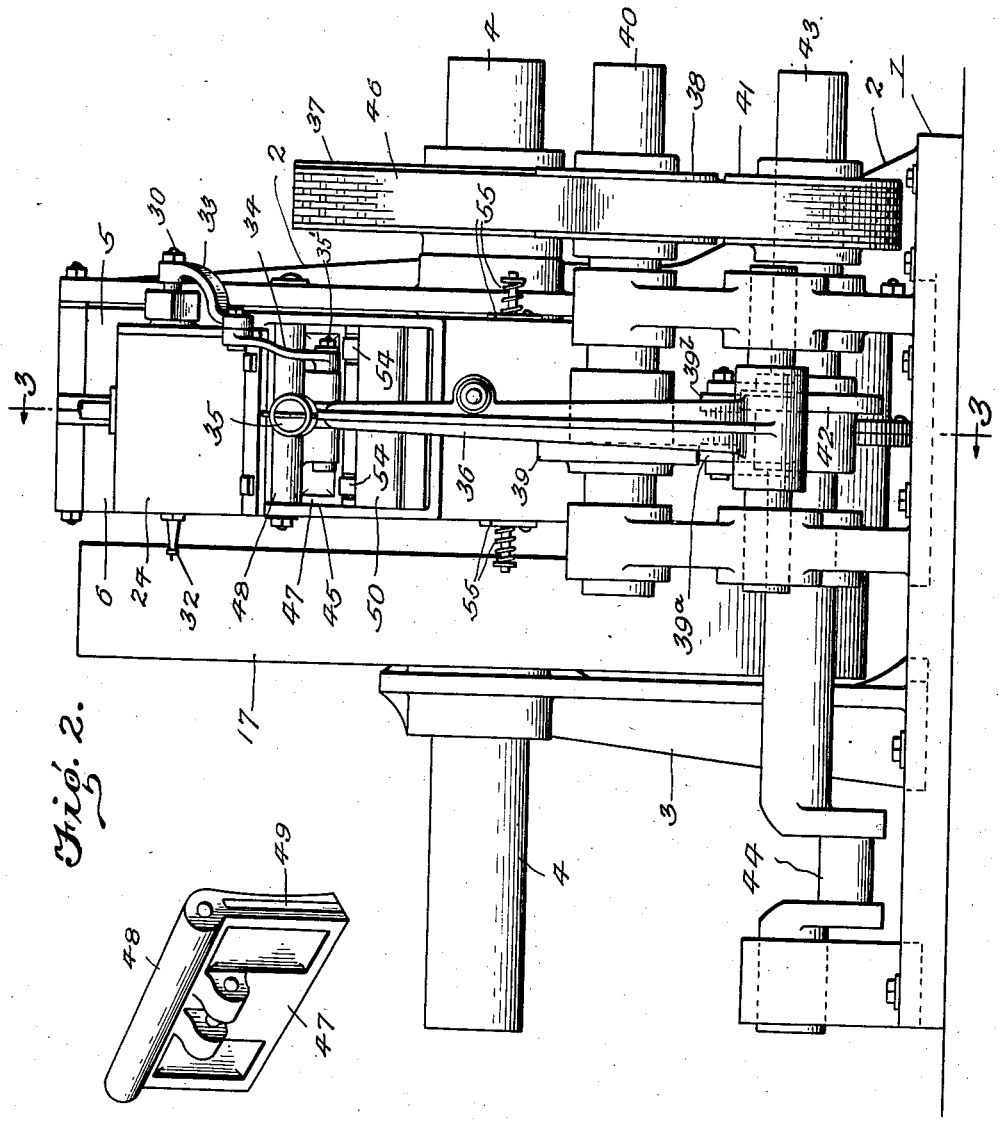
Figure 2 is a front elevation.

Referring to the figures by characters of reference, 1 designates the base of the engine on which are mounted posts 2 and 3 providing bearings for the main shaft 4. Mounted on the base also are the opposed halves 5 and 6 of the stator, these being tightly connected at regular intervals by bolts 7. These opposed sections of the stator are spaced apart along their inner peripheries to define a slot 8 of uniform width and snugly fitted in this slot but capable of working therein, is the peripheral portion of a rotor in the form of a disk or wheel 9 having flat side faces. This rotor has slots 10 extending into its periphery at those points where pistons are to be located.

The stator sections define an annular ring-like chamber 11 which is rectangular in cross-sectional contour. In this chamber are located a desired number of pistons 12 which are of the same contour as the cross-sectional contour of the chamber 11 and each piston is provided with a flat stem 13 which is fitted snugly in one of the slots 10 and is flush with the side faces of the rotor. The stems are detachably fastened to the rotor by bolts 14 and it will be apparent, therefore, that power applied to the pistons in chamber 11 will result in driving the rotor.

Shaft 4 is provided with an annular flange 15 to which the rotor 9 is secured by bolts 16. These bolts also serve to attach a fly-wheel 17 to the shaft.

The walls of slot or annular space 8 are formed with angular grooves concentric with the chamber 11 and indicated at 18. In these grooves are seated sealing rings 19 which are held firmly pressed against the opposed faces of the rotor by waved springs 20 seated in the groove and back of the rings. Thus leakage of gases through space 8 is eliminated.

Any desired number of pistons may be used. The engine illustrated is designed with two pistons which are diametrically opposite to each other. Each piston is formed in its edges with straight grooves 21 and in these grooves are fitted sealing strips 22 which are angular in cross-section and have lapping ends. Waved springs 23 are seated in the grooves 21 and are positioned to press strips 22 outwardly so that snug working fits are thus provided between the pistons and the walls of the chamber 11.

Mounted on the stator is a casing 24 constituting a combustion chamber or, in a steam engine, a steam chest. This casing can be provided with a water jacket 25 and mounted for rotation in the chamber and fitted snugly against the walls thereof is a cylindrical valve 26 having an inlet 27 and an outlet 28. The outlet 28 is adapted to move into and out of register with a port 28'. One end of the valve is closed as shown at 29 and has a stem 30 extending therefrom and outwardly beyond the casing 24.

The valve 26 is hollow to provide an explosion chamber 31 which is open at that end remote from stem 30 and projecting into the open end of the valve is a spark plug 32 controlled by suitable timing mechanism.

Stem 30 has an arm 33 secured to the outer end thereof and this arm is connected by a link 34 to a rod 35 and a rock-arm 36.

A gear 37 is secured to shaft 4. Another gear 38 and a cam 39 are secured to a shaft 40. A second shaft 43 carries a gear 41 and a cam 42.

The gears 38 and 41 have half as many teeth as gear 37 so as to rotate twice to one rotation of gear 37. The shaft 43 can be provided with a crank 44 for driving an air pump (not shown) whereby air can be forced directly into the explosion chamber 31 or into a tank, not shown, for storing the air under pressure.

Motion is transmitted between gears 37, 38 and 41 by a chain belt 46. The chamber 11 is provided with an angular vent 45 adapted to be closed by a breech or abutment 47 hingedly mounted at 48 and proportioned to close the chamber 11 when moved its maximum distance into the chamber. The breech has marginal sealing means 49 for fitting snugly against the walls of chamber 11 and there also is provided a cushion or stop 50 for limiting the movement of the breech into the vent 45.

Rollers 39ᵃ and 39ᵇ are carried by a rock-arm 36ᵃ movable with arm 36 and are positioned to engage, respectively, the cams 39 and 42 which are offset laterally relative to each other. The two cams cooperate to move the rollers and the rock-arm 36ᵃ back and forth positively and, obviously, this back and forth movement will be transmitted through the arm 36 to rod 35 which, as shown, is pivotally connected at 35' to the breech 47. A link 34 extends from the pivotal connection 35' to the arm 33 of valve 26 so that when arm 36 is swung in one direction it will open breech 47 by swinging it back into the vent 45 and at the same time open the port 27 and close the port 28. When arm 36 is moved in the opposite direction, however, the breech 47 will be swung into position as shown in Fig. 3 and valve 26 will be rotated to close part 27 and open port 28.

Figure 3:
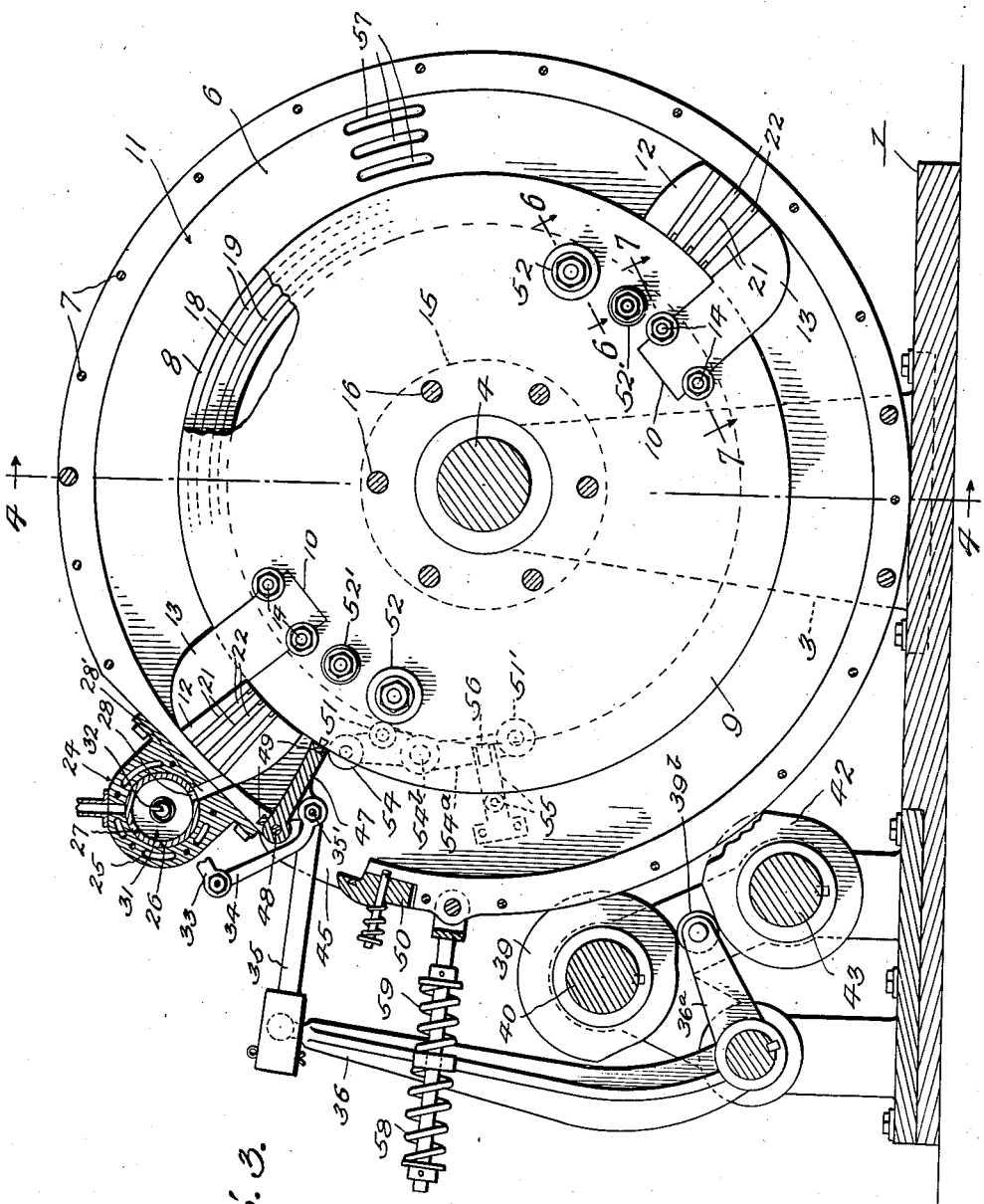
Figure 3 is a section on line 3—3, Figure 2 with parts shown in side elevation.
Figure 4:
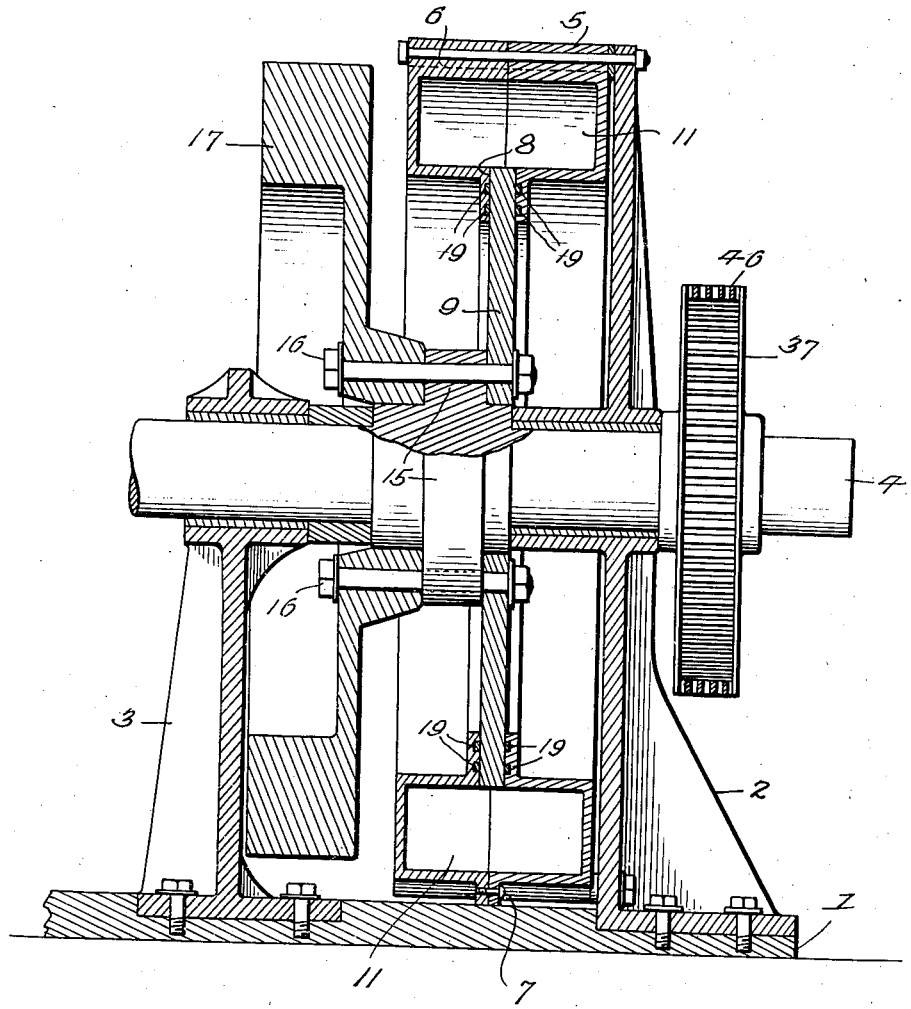
Figure 4 is a section on line 4—4, Figure 1.

For the purpose of locking the breech in active position, as shown in Figure 3, a blocking roller 54 is mounted on one end of a lever 54ᵃ which is fulcrumed between its ends as shown at 54ᵇ. This lever carries rollers 51 and 51' located at opposite sides of its fulcrum 54ᵇ.

The rotor is provided with a set of diametrically opposed tripping rollers 52 and, in advance thereof and adjacent thereto, with another set of tripping rollers 52'. The rollers are so positioned that during the rotation of the engine one of the rollers 52' will first come against roller 51', thereby shifting lever 54ᵃ to swing the blocking roller 54 through an opening 53 (Fig. 5) and out of position back of the breech 47. Immediately thereafter the next adjoining roller 52 will engage roller 51, which has been brought into the path thereof and will push it outwardly so as to return the roller 54 through opening 53 to its blocking position back of the breech. This opening is in the inner circular wall of one of the stator sections 5 and 6 and said wall serves as a stop for limiting the movement of the lever 54ᵃ when the roller 54 comes to the blocking position. The parts are so timed that during this interval between the movement of the roller 54 into and out of locking position, the breech will be swung outwardly into vent 45, a piston will pass the breech, and the breech will be moved back into position back of the piston. Obviously when the lever 54ᵃ is positioned as in Figs. 1 and 3 the roller 54 will block the breech or abutment 47 so that it cannot swing back into the opening 45. This is due to the fact that when in blocking position the roller 54 is past the dead center and the lever is limited in its movement by contact with the inner wall of the stator section. The lever is held in this position after being thrust thereto by roller 52, by the latching means hereinafter explained and will not shift out of said blocking position until roller 52' next following roller 52, comes against roller 51' on the lever 54ᵃ and shifts it forcibly to the left in Fig. 1 against the action of said latching means, thereby removing roller 54 from blocking position and permitting the breech or abutment 47 to move toward the opening or vent 45 to close it.

The latching means which has been provided for the purpose of holding the lever 54ᵃ in position with its roller 54 behind the breech so that it will not move upon restraint readily away from blocking position, comprises a spring-pressed lever 55 mounted on the side of the stator and said lever carries a roller 56 which presses against lever 54ᵃ. A rib 56' or the like can be provided on the side of the lever for the purpose of snapping past the roller when the lever is moved to one or the other of its extreme positions.

It is to be understood that the breech blocking mechanism is to be duplicated at the two sides of the engine as will be apparent by referring particularly to Fig. 5.

A fuel mixture forced into casing 24 will be fired at the proper time so that the generated gases will escape through the outlet and between the closed breech and one of the pistons. Thus the rotor will be caused to operate and as said piston passes an exhaust port 57 the spent gases will escape. In the meantime the other piston is advancing toward the closed breech, driving through the vent 45 any gases in the path thereof. As the piston approaches the vent, the breech is moved abruptly into the vent but as soon as the piston reaches the outlet port 28' communicating with valve port 28, the breech is closed behind the piston and the new charge is then exploded.

Springs 58 and 59 can be used to stabilize the rock-arm 36 and aid the starting and stopping of the breech 47. The opening or outward movement of the breech also is aided by pressure from back of the piston as it nears its exhaust port. Thus a very close fit can be provided between the breech and the walls of the chamber 11.

Any desired number of pistons can be used and the mechanism can be constructed and timed to insure operation of the parts in proper succession.

Obviously more than one engine can be connected to the main shaft 4.

What is claimed is:

1. In a rotary engine a disk-like rotor, a stator including opposed ring-like members having a tight working fit against the marginal portion of the rotor and defining a circular piston chamber angular in cross-section, and an explosion chamber in intermittent communication with the piston chamber, of opposed pistons carried by the disk and movable in a circular path within the piston chamber, there being an exhaust port in one wall of the stator adjacent to the explosion chamber, a breech hingedly mounted at one end in said port, means operating in timed relation with the pistons for swinging the breech into the port to clear the pistons successively and then into position across the piston chamber and back of the cleared piston, and a locking means for the breech including a pivoted lever, means carried by the rotor for shifting one end of the lever past a dead center to one extreme position behind the breech when said breech is located across the piston chamber, means carried by the rotor for shifting the lever to its other extreme position to release the breech therefrom, and a latch for holding the lever against accidental movement when in either of said extreme positions.

2. In a rotary engine a disk-like rotor, a stator including opposed ring-like members having a tight working fit against the marginal portion of the rotor and defining a circular piston chamber angular in cross-section, and an explosion chamber in intermittent communication with the piston chamber, of opposed pistons carried by the disk and movable in a circular path within the piston chamber, there being an exhaust port in one wall of the stator adjacent to the explosion chamber, a breech hingedly mounted at one end in said port, means operating in timed relation with the pistons for swinging the breech into the port to clear the pistons successively and then into position across the piston chamber and back of the cleared piston, and a locking means for the breech including a pivoted lever, rollers carried by the rotor each operating to shift one end of the lever past a dead center to one extreme position behind the breech when said breech is located across the piston chamber back of and close to one of the pistons, and supplemental rollers carried by the rotor for pressing successively against the other end of the lever to move the lever to its other extreme position and release the breech for movement out of the path of the pistons and into the exhaust port, said lever and the hinge of the breech cooperating to hold the breech at opposed sides when subjected to the force of an exploded charge.

3. In a rotary engine a disk-like rotor, a stator including opposed ring-like members having a tight working fit against the marginal portion of the rotor and defining a circular piston chamber angular in cross-section, and an explosion chamber in intermittent communication with the piston chamber, of opposed pistons carried by the disk and movable in a circular path within the piston chamber, there being an exhaust port in one wall of the stator adjacent to the explosion chamber, a breech hingedly mounted at one end in said port, means operating in timed relation with the pistons for swinging the breech into the port to clear the pistons successively and then into position across the piston chamber and back of the cleared piston, and a locking means for the breech including a pivoted lever, rollers carried by the rotor each operating to shift one end of the lever past a dead center to one extreme position behind the breech when said breech is located across the piston chamber back of and close to one of the pistons, supplemental rollers carried by the rotor for pressing successively against the other end of the lever to move the lever to its other extreme position and release the breech for movement out of the path of the pistons and into the exhaust port, said lever and the hinge of the breech cooperating to hold the breech at opposed sides when subjected to the force of an exploded charge, and a latch for holding the lever against accidental movement when in either extreme position.

JOSEPH D. INGRAM.